United States Patent
Ku

(10) Patent No.: US 6,914,782 B2
(45) Date of Patent: Jul. 5, 2005

(54) MULTI-OPENING HEAT-DISSIPATION DEVICE FOR HIGH-POWER ELECTRONIC COMPONENTS

(75) Inventor: Shih-Chang Ku, Hsin Tien (TW)

(73) Assignee: Via Technologies, Inc., Taipei Hsien (TW)

( * ) Notice: Subject to any disclaimer, the term of this patent is extended or adjusted under 35 U.S.C. 154(b) by 19 days.

(21) Appl. No.: 10/358,290

(22) Filed: Feb. 5, 2003

(65) Prior Publication Data

US 2003/0151900 A1 Aug. 14, 2003

(30) Foreign Application Priority Data

Feb. 8, 2002 (TW) .................................... 91201753 U

(51) Int. Cl.[7] .............................................. G06F 1/16
(52) U.S. Cl. ...................... 361/700; 361/695; 165/80.3
(58) Field of Search ...................... 361/683, 686–696, 361/698–700, 704, 715–720; 415/177, 178, 213.1, 214.1; 165/121–126, 80.3

(56) References Cited

U.S. PATENT DOCUMENTS 5,898,568 A * 4/1999 Cheng ........................ 361/695
5,966,286 A * 10/1999 O'Connor et al. .......... 361/699
6,407,921 B1 * 6/2002 Nakamura et al. .......... 361/700
6,474,409 B1 * 11/2002 Sterner ......................... 165/96

* cited by examiner

Primary Examiner—Lynn Feild
Assistant Examiner—Anthony Q. Edwards
(74) Attorney, Agent, or Firm—Rosenberg, Klein & Lee

(57) ABSTRACT

A multi-opening heat-dissipation device for high-power electronic components includes a body, an extension extended from the body, and a radial fan. The radial fan is mounted on a bottom aperture of the body. The body further comprises a primary opening on a first face and a cavity communicating between the bottom aperture and the primary opening as a wind path. The body further includes at least one additional opening on a second face of the body. The at least one additional comprises a second opening faces a circuit board on which a high-power electronic component is mounted. The cool air can flow to at least one of the topside and bottom side of the circuit board through the second opening and cool the high-power electronic components directly.

13 Claims, 10 Drawing Sheets

MULTI-OPENING HEAT-DISSIPATION DEVICE FOR HIGH-POWER ELECTRONIC COMPONENTS

FIELD OF THE INVENTION

The present invention relates to a multi-opening heat-dissipation device for high-power electronic components, and more specifically to a multi-opening heat-dissipation device for high-power electronic components having better heat-dissipation effects without increasing the form factor thereof.

BACKGROUND OF THE INVENTION

Conventional notebook computers and portable appliances are developed to be more compact in size. As a result, the components found inside notebook computers and portable appliances are closely packed, resulting impeded air circulation. More importantly, notebook computers and portable appliances cannot use axial fans to remove heat from their cases, as found in desktop computers. Therefore, conventional notebook computers and portable appliances generally use a remote heat exchanger to provide a heat-dissipation solution. The heat generated by notebook computers and portable appliances is removed through thermal conduction or forced convection.

FIGS. 1 and 2 show a prior art remote heat exchanger (1) comprising a body (11), an extension (12) extending from the body (11) and a fan (13). With reference to FIG. 3 as well, the body (11) has a cavity (111) therein and the cavity (111) has a single primary opening (112) on left side thereof and a radial fan (13) mounted on a bottom aperture of the body (11). The cool air sucked from the bottom aperture is driven to the primary opening (112). The extension (12) is extended from a right top portion of the body (11). A heat pipe (14) is provided in the remote heat exchanger (1) and is embedded in the extension (12) and the body (11). The extension (12) has a thermal interface (121) on a bottom thereof to transfer heat from an electronic component (31) attached thereto to the heat pipe (14). The thermal interface (121) can be, for example, a thermal grease or a thermal pad used to be applied between two objects to conduct heat from one to the other.

FIG. 3 shows a sectional view of a chassis (2) of a notebook computer or a portable appliance. The primary opening (112) is provided to match an air outlet (22) of the chassis (2), and the fan (13) is provided to match an air inlet (21) of the chassis. The CPU (31) on topside of the circuit board (3) is in contact with the thermal interface (121) of the extension (12). The other major heat generating component (32) (such as North Bridge chip, NB) and heat generating component (33) (such as South Bridge chip, SB) are arranged on the bottom side of the circuit board (3). During operation, the heat generated by the CPU (31) is conducted to the thermal interface (121) of the extension (12) and then conducted to the body (11) through the heat pipe (14). Then, the cool air drawn through the fan (13) blows over the body (11) and carry away the heat in the body (11) and is then ejected out of the air outlet (22) through the primary opening (112). Therefore, the heat generated by the CPU (31) is efficiently removed. As can be seen from above description, the prior art remote heat exchanger (1) uses a heat pipe (14) or a heat spreader to conduct the heat generated by the CPU (31) to a specific location. Moreover, the remote heat exchanger (1) sucks cool air by the radial fan (13) and the cool air flows through the cavity (111) to the primary opening (112). Therefore, the heat is carried by the cool air and ejected out of the notebook computer or portable appliance through the air outlet thereof.

However, the prior art remote heat exchanger (1) has only one primary opening (112) and is used to remove heat from components on one side of the circuit board. Therefore, the prior art remote heat exchanger (1) can only remove heat from the CPU (31) on one side of the circuit board (3) and cannot remove heat from other heat generating component such as component (32) or component (33), found on the other side of the circuit board (3). As a result, the performance and lifetime of the electronic components other than the CPU (31) can be deteriorated due to high temperature.

As can be seen from above description, the notebook computer has limited space for the incorporation of a heat-dissipation device. Once the arrangement of the internal modules and components are determined, it is almost impossible to change the existing arrangement, including the size and the form factor. The redesign job is time consuming and costs a lot. The provision of heat-dissipation device to simultaneously solve the heat-dissipation problem for the components on both sides of the circuit board (3) while keeping the size and form factor is a problem that requires a solution.

SUMMARY OF THE INVENTION

It is the object of the present invention to provide a multi-opening heat-dissipation device for high-power electronic components, wherein cool air can flow to both the topside and bottom side of a circuit board on which a high-power electronic component is mounted through an additional opening and may also cool the electronic components thereon by forced convection.

To achieve above object, the present invention provides a multi-opening heat-dissipation device for high-power electronic components comprising a body, an extension extended from the body, and a radial fan mounted on a bottom aperture of the body. The body is provided a primary opening on a first lateral face thereof and a cavity therein communicating between the primary opening and the bottom aperture. The body further comprises at least one additional opening on a face of the body other than the first face. Therefore, any pneumatic pressure unused by the primary opening can be exploited by the additional opening to provide better a beat-dissipation effect while the form factor of the heat-dissipation device is not increased. More particularly, cool air can flow to both the topside and bottom side of a circuit board through the additional opening and may also cool the electronic components thereon The various objects and advantages of the present invention will be more readily understood from the following detailed description when read in conjunction with the appended drawing, in which:

DETAILED DESCRIPTION OF THE INVENTION

Figure 1:
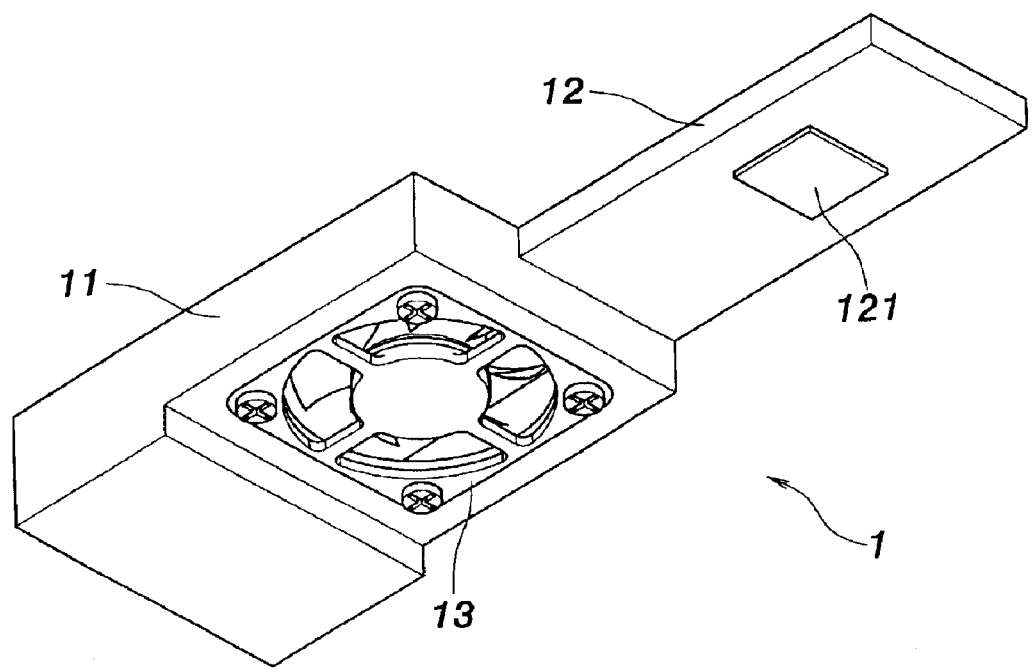
FIG. 1 shows a top perspective view of the prior art heat-dissipation device.
Figure 2:
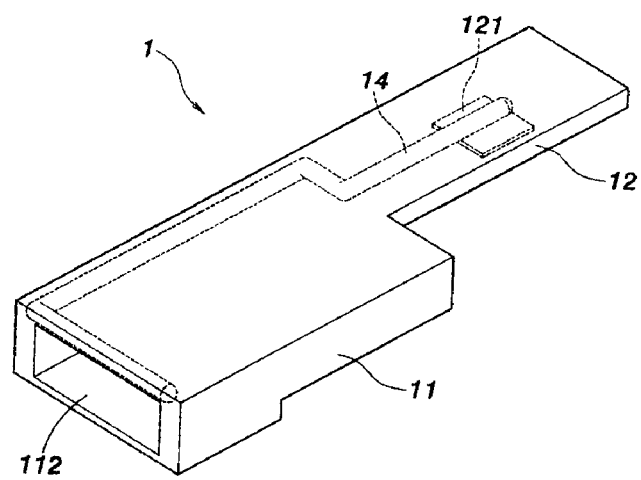
FIG. 2 shows a bottom perspective view of the prior art heat-dissipation device.
Figure 3:
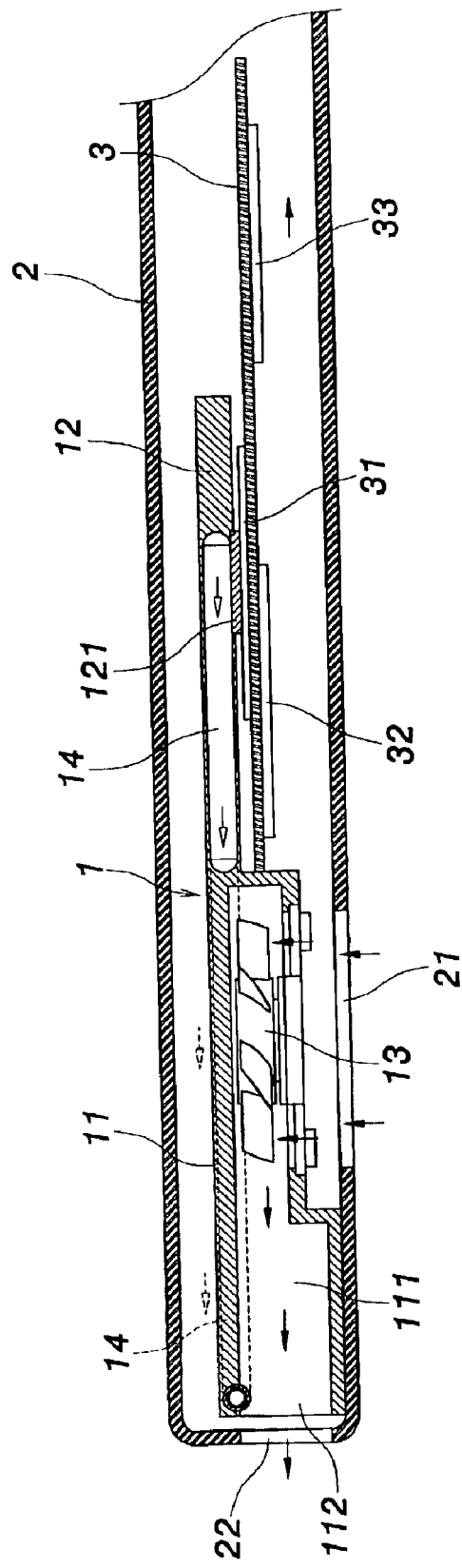
FIG. 3 shows a sectional view of the chassis of a notebook computer with the prior art heat-dissipation device.
Figure 4:
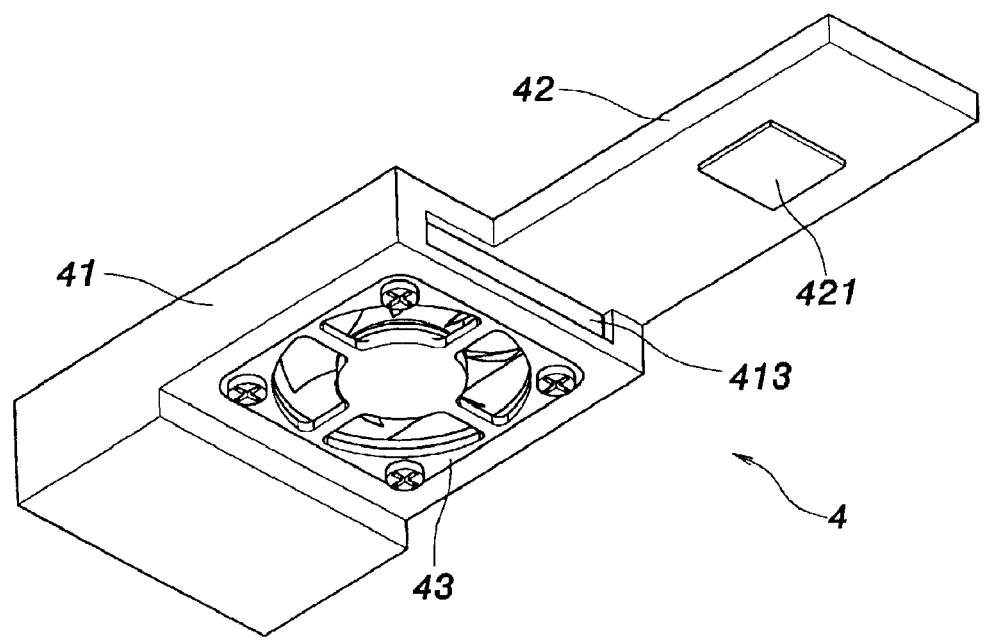
FIG. 4 shows a top perspective view of the heat-dissipation device according to a first preferred embodiment of the present invention, which has a full-extent additional opening.

FIG. 4 shows the perspective view of the present invention. The present invention is intended to provide a multi-opening heat-dissipation device for a high-power electronic apparatus 4, which comprises a body (41), an extension (42) extending from a right top wall of the body (11), a fan (43) and a plurality of openings.

Figure 5:
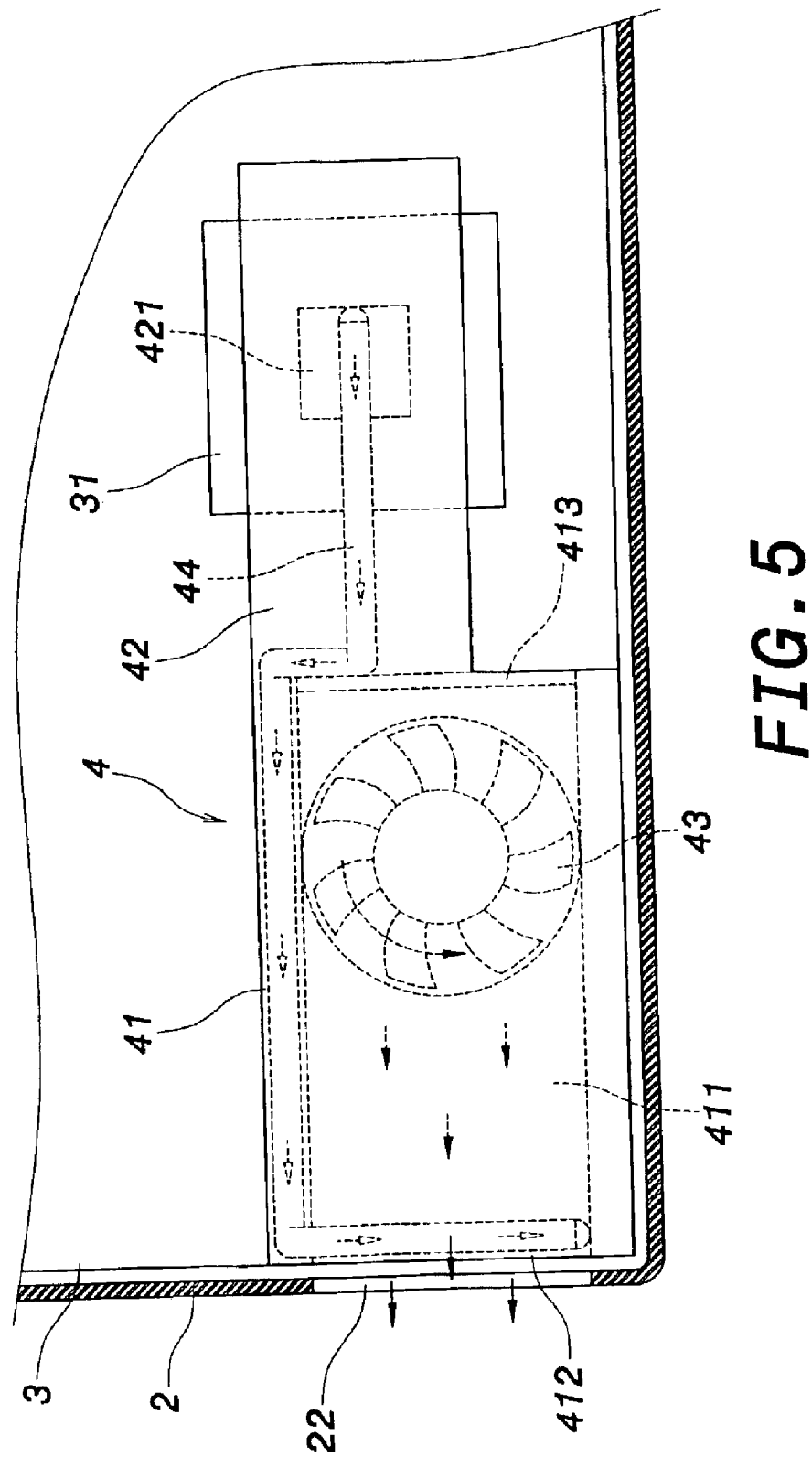
FIG. 5 shows a partially top sectional view of a chassis of a notebook computer with the heat-dissipation device according to a first preferred embodiment of the present invention.
Figure 6:
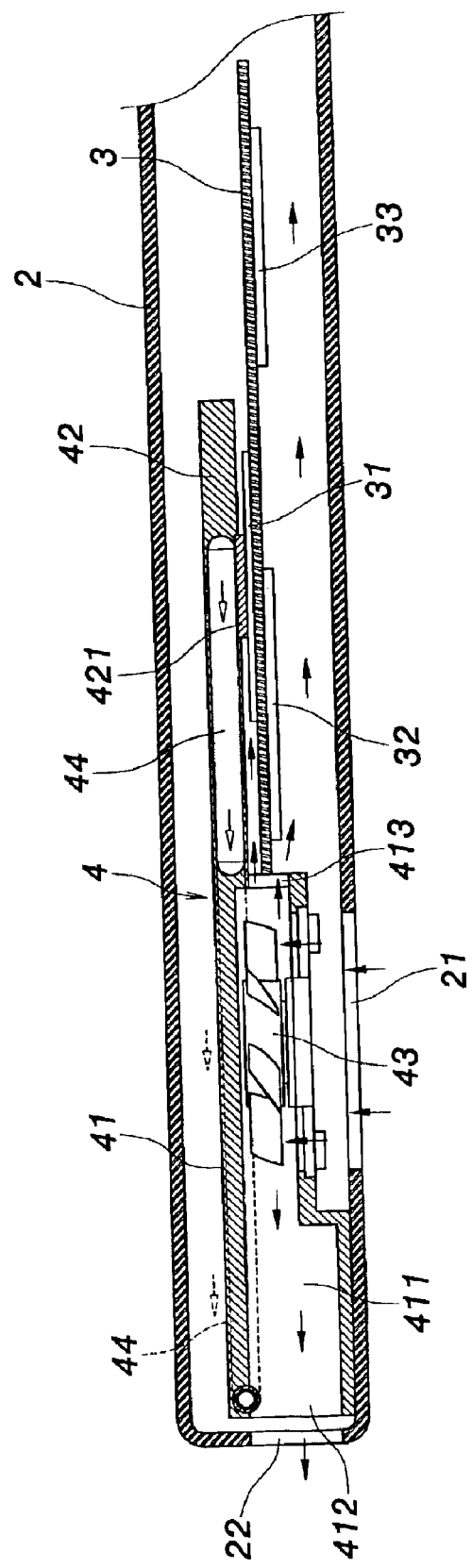
FIG. 6 shows a partially lateral sectional view, according to FIG. 5.
Figure 7:
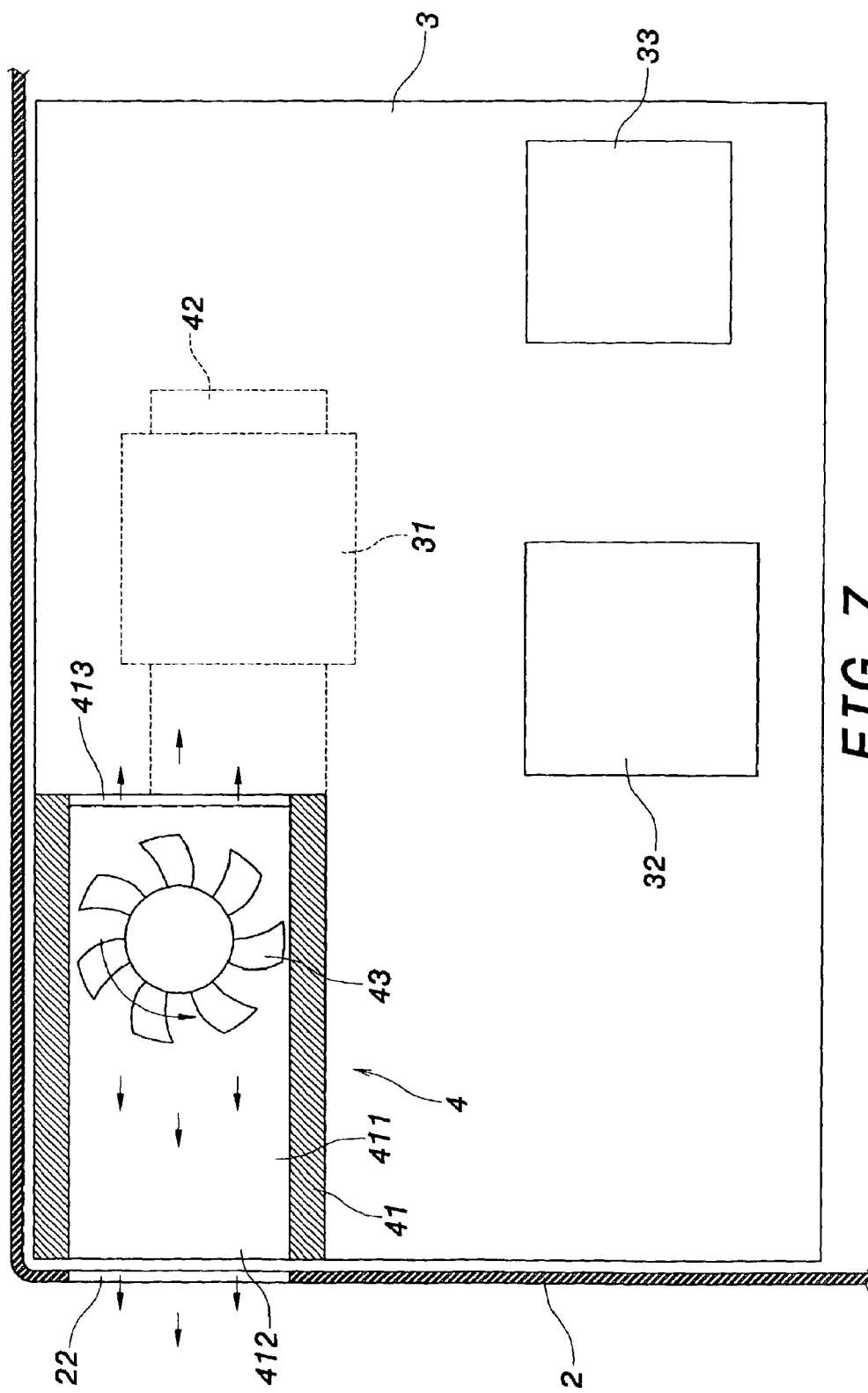
FIG. 7 shows a partially top sectional view, according to FIG. 6.

With reference to FIGS. 4 to 6, the heat-dissipation device (4), according to the first embodiment of the present invention, has a body (41) having a cavity (411) therein and the cavity (411) has a primary opening (412) on left side thereof. The body (41) has a radial fan (13) mounted on a bottom aperture thereof. A heat pipe (44) is provided in the heat-dissipation device (4) and is embedded in both the extension (42) and the body (41). A thermal interface (421) is provided on a bottom of the extension (42) in contact with the high-power electronic component, such as a CPU (31) to transfer heat from the electronic component to the heat pipe (44). Moreover, the body (41) has at least one additional opening on the other lateral sides in addition to the primary opening (412). The addition opening can be arranged on any vertical or lateral face of the body (41) around the aperture, a face on thickness direction of the body (41), or a face opposite to primary opening (412). The area size of the additional opening or the area ratio thereof to the primary opening (412) depends on the practical requirements. As shown in FIGS. 5–7; the body (41) has a second opening (413) arranged on right side thereof and is fully opened.

FIGS. 5–7 show sectional views of a notebook computer or a portable appliance using the heat-dissipation device (4), according to the first embodiment of the present invention. The primary opening (412) is aligned with an air outlet (22) on the chassis 2 and the fan (43) is aligned with an air inlet (21) on the chassis 2. A CPU (31) is on the topside of the circuit board (3) and is in contact with the thermal interface (421) of the extension (42). Two electronic components (32) and (33) are arranged on the bottom of the circuit board (3). As shown in FIG. 6, the CPU (31) and the two electronic components (32) and (33) are cooled by air flowing from the secondary opening (413), which is fully opened. The heat of the CPU (31) is conducted to the body (41) through the thermal interface (421) and the heat pipe (44) and is removed through the primary opening (412) and the air outlet (22) by the cool air sucked in by the fan (43). Moreover, because the CPU (31) and the two electronic components (32) and (33) are cooled by air flowing from the secondary opening (413), which is fully opened, the cool air sucked in by the fan (43) also flow to the CPU (31) and the two electronic components (32) and (33) through the fully opened second opening (413). Therefore, the heat generated by the CPU (31) can be simultaneously removed by the thermal interface (421), the heat pipe (44), and by the air flowing through the fully opened second opening (413). In addition, the two electronic components (32) and (33), which were not blown by the cold air in the prior design, can also be blown by the cold air in the present invention. The heat-dissipation device (4) thus has a better effect while the form factor thereof is not changed. As the fully opened second opening (413) allows air to flow over the CPU (31) and the two electronic components (32) and (33), the cool air can also flow to the topside and bottom side of the circuit board (3) by forced convection. Therefore, according to the present invention, the heat-dissipation device (4) can effectively reduce the temperature of multiple electronic components, such as the electronic components (32) and (33).

A temperature reduction by 2–3° C. results in improved performance and durability for notebook computers and portable appliances. Therefore, according to the present invention, the heat-dissipation device (4) is intended to reduce the temperature of high-power electronic components by 2–3° C.

As shown in FIGS. 4 to 7, the simulation for the first embodiment of the present invention is performed for a small portable appliance with a 192×150×24 mm form factor, wherein the heat-dissipation device (4), according to the present invention, is arranged in the chassis (2) of the portable appliance. The heat-dissipation device (4) has a fully opened second opening (413) provided opposite to the primary opening (412). In this simulation the two electronic components (32) and (33) are simulated as a north bridge chip (NB) and a south bridge chip (SB), respectively, each working at two different operational parameters.

In the first simulation with the power consumption CPU (4.5 W)/NB(2 W)/SB(0.7 W) the following results were achieved:

$T_{case\_CPU}$ having 0.3° C. temperature reduction $T_{case\_NB}$ having 2.7° C. temperature reduction $T_{case\_SB}$ having 2.7° C. temperature reduction In the second simulation with the power consumption CPU (6.0 W)/NB(2 W)/SB(0.7 W) the following results were achieved:

$T_{case\_CPU}$ having 0.1° C. temperature increment $T_{case\_NB}$ having 2.4° C. temperature reduction $T_{case\_SB}$ having 1.9° C. temperature reduction In the above two simulations, the north bridge chip (32), with a faster speed, has more than a 2° C. reduction in temperature and the slower south bridge chip (33) has about a 2° C. reduction in temperature. In the second simulation, a temperature reduction of around 0.1° C. was noticed. This increase in temperature had little effect on the performance of the CPU (31). Therefore, by the provision of the fully opened second opening (413), cool air can flow to the desired location in order to reduce the temperature of the electronic components (32) and (33) by a single fan. Moreover, the form factor of the heat-dissipation device (4) is not changed while both the weight and the material used are reduced.

Figure 8:
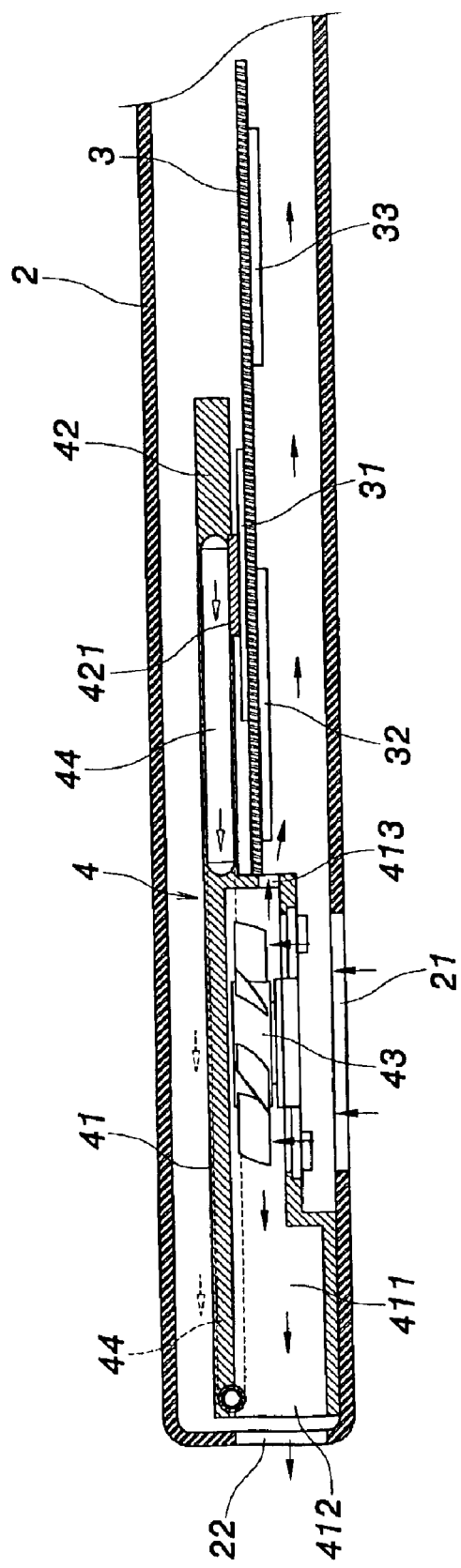
FIG. 8 shows a side sectional view of a chassis of a notebook computer with the heat-dissipation device according to a second preferred embodiment of the present invention and having an additional opening, which is not fully opened.

FIG. 8 shows the second preferred embodiment of the present invention, the second opening (413) is partially opened and is located at a lower side of the face from which the extension extending corresponding to the two electronic components (32) and (33) on the bottom side of the circuit board (3). The cool air can flow to the two electronic components (32) and (33) on the bottom side of the circuit board (3).

Figure 9:
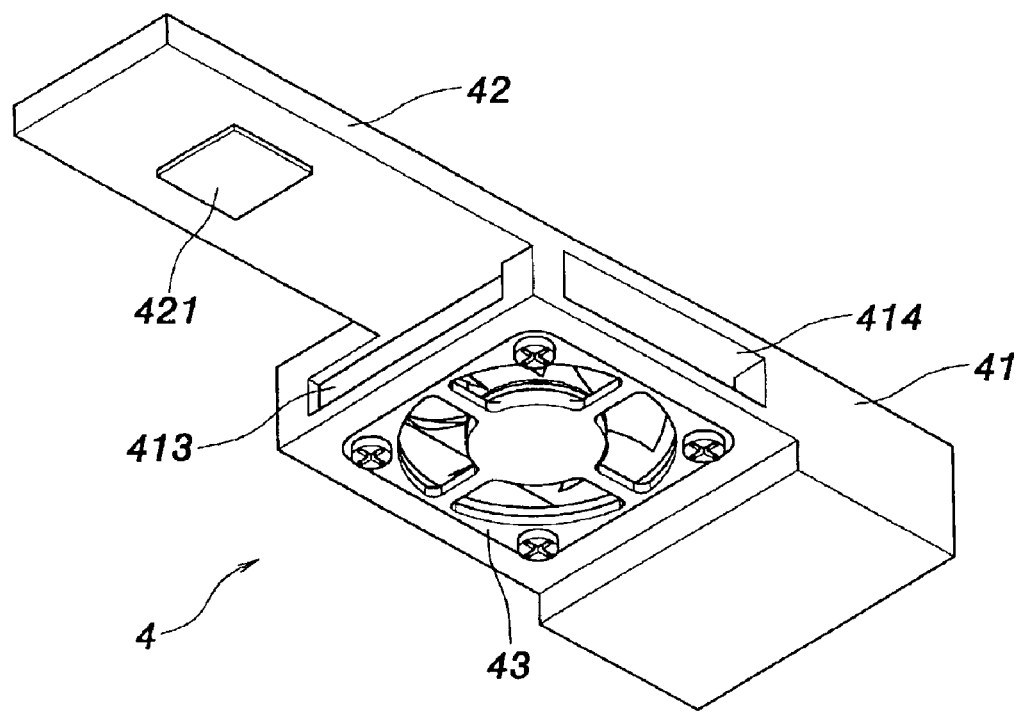
FIG. 9 shows a top perspective view of the heat-dissipation device according to a third preferred embodiment of the present invention; and, FIG. 10 shows a top sectional view of a chassis of a notebook computer with the heat-dissipation device according to the third preferred embodiment of the present invention.
Figure 10:
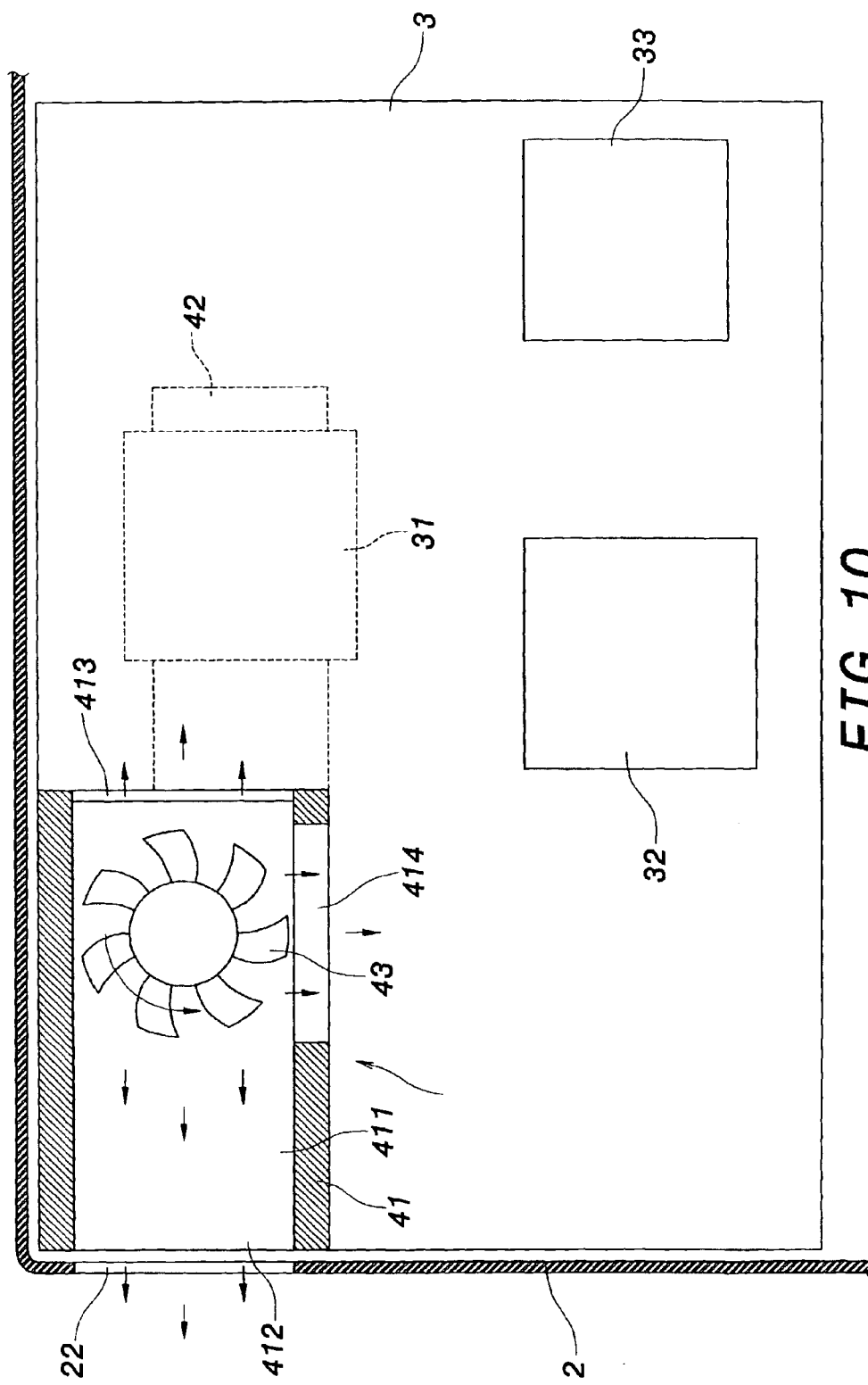

FIGS. 9 and 10 show the third preferred embodiment of the present invention. According to the present embodiment, the heat-dissipation device (4) has a primary opening (412) on the left side of the body (41) and a fully opened second opening (413) on the right side of the body (41). Moreover, the heat-dissipation device (4) has a third opening (414) on the rear side of the body (41) to fully exploit the heat-dissipating effect of the cool air.

FIG. 10 shows a heat-dissipation device (4), according to the third preferred embodiment of the present invention, having the fully opened second opening (413) and the third opening (414) is adopted for a notebook computer or a portable appliance. As FIG. 10 illustrates, the two electronic components (32) and (33) are arranged on the bottom side of the circuit board (3), the CPU (31) is arranged on the topside of the circuit board (3) and is in contact with the thermal interface (421). The cool air flows through the second opening (413) to cool the CPU (31) and through the third opening (414) to cool the two electronic components (32) and (33) that are arranged on the bottom side of the circuit board (3) and other components (not shown). Therefore, pneumatic pressure that has not been used by the primary opening (412) can be exploited by the fully opened second opening (413) and the third opening (414) to cool components other than the CPU (31).

To sum up, the multi-opening heat-dissipation device for high-power electronic components according to the present invention has the following advantages:

1. The cool air can be guided to locations on the topside and bottom side of the circuit board (3) other than the wind path outlet of the chassis. The electronic components (32) and (33) at those locations can be cooled by a single fan (43) with forced convection.

2. The heat-dissipation device (4) can be provided with an opening on the front side, rear side or the left side of the body (41) thereof, whereby the pneumatic pressure not used by the primary opening (412) can be exploited by the other openings. Fan noise is also reduced.

3. The additional opening will not change the form factor of the heat-dissipation device (4) while both the material used and weight are also reduced.

Although the present invention has been described with reference to the preferred embodiment thereof, it is to be understood that the invention is not limited to the details thereof. Various substitutions and modifications have been suggested in the foregoing description, other modifications will be clear to skilled artisans. Therefore, all such substitutions and modifications are intended to be included within the scope of the invention, as defined in the appended

What is claimed is:

1. A multi-opening heat-dissipation device for high-power electronic components, comprising
a body;
an extension extended from said body;
a radial fan mounted on a bottom aperture of said body;
a primary opening on a first lateral face of said body;
a cavity provided in said body communicating between said bottom aperture and said primary opening and forming a main wind path through said body; wherein
said body further comprising at least one additional opening on a second lateral face of said body communicating with said cavity, said second lateral face being positioned adjacent to both an upper surface and a lower surface of a circuit board on which said high-power electronic components are mounted, said at least one additional opening including a second opening on a second face from which said extension is extension and a third opening positioned on a third face of said body.

2. The multi-opening heat-dissipation device for high-power electronic components as in claim 1, wherein said at least one additional opening is arranged on a face vertical to the bottom aperture.

3. The multi-opening heat-dissipation device for high-power electronic components as in claim 1, wherein said at least one additional opening is arranged on a lateral thickness of said body.

4. The multi-opening heat-dissipation device for high-power electronic components as in claim 1, wherein said second opening is one of a fully opened type and a partially opened type.

5. The multi-opening heat-dissipation device for high-power electronic components as in claim 1, further comprising a heat pipe embedded therein and extending through both the body and the extension.

6. The multi-opening beat-dissipation device for high-power electronic components as in claim 1, wherein the additional opening is arranged in close proximity to an electronic element requiring heat dissipation.

7. The multi-opening heat-dissipation device for high-power electronic components as in claim 1, wherein the additional opening is positioned opposite to the primary opening.

8. The multi-opening heat-dissipation device for high-power electronic components as in claim 5, wherein said at least one additional opening includes a second opening on a second face from which the extension is extended.

9. The multi-opening heat-dissipation device for high-power electronic components as in claim 5, wherein the additional opening is arranged on a lateral thickness of said body.

10. The multi-opening heat-dissipation device for high-power electronic components as in claim 5, wherein the additional opening is a second opening on a face of the body in the direction of the extension.

11. The multi-opening heat-dissipation device for high-power electronic components as in claim 10, wherein the second opening is one of a fully opened type and a partially opened type.

12. The multi-opening heat-dissipation device for high-power electronic components as in claim 5, wherein the at least one additional opening is arranged in close proximity to an electronic element requiring heat dissipation.

13. A multi-opening heat-dissipation device for high-power electronic components, comprising a body;

an extension extended from said body;

a heat pipe embedded in said heat-dissipation device and extending through both said body and said extension;

a radial fan mounted on a bottom aperture of said body;

a primary opening on a first lateral face of maid body;

a second opening on a second lateral face of said body and in a direction of said extension, said second lateral face being positioned adjacent to both an upper surface and a lower surface of a circuit board on which said high-power electronic components are mounted;

a third opening positioned on a third face of said body; and, a cavity provided in said body communicating between said bottom aperture and said primary opening and forming a main wind path through said body, said second and third openings being in communication with said cavity.

* * * * *